US012729446B2

(12) United States Patent
Ikegaya

(10) Patent No.: US 12,729,446 B2
(45) Date of Patent: Sep. 8, 2026

(54) HYDROGEN STATION, CONTROL UNIT FOR HYDROGEN STATION, AND PROGRAM FOR HYDROGEN STATION

(71) Applicant: YAZAKI CORPORATION, Tokyo (JP)

(72) Inventor: Koji Ikegaya, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 378 days.

(21) Appl. No.: 18/396,270

(22) Filed: Dec. 26, 2023

(65) Prior Publication Data

US 2024/0133056 A1 Apr. 25, 2024
US 2024/0229255 A9 Jul. 11, 2024

Related U.S. Application Data

(63) Continuation of application No. PCT/JP2022/023201, filed on Jun. 8, 2022.

(30) Foreign Application Priority Data

Jul. 13, 2021 (JP) ................................ 2021-115645

(51) Int. Cl.
*C25B 1/55* (2021.01)
*C25B 1/04* (2021.01)
(Continued)

(52) U.S. Cl.
CPC .................. *C25B 1/55* (2021.01); *C25B 1/04* (2013.01); *C25B 15/02* (2013.01); *G06Q 50/06* (2013.01); *H01M 8/04201* (2013.01); *H01M 8/0656* (2013.01); *H02J 15/50* (2026.01); *H01M 2250/10* (2013.01)

(58) Field of Classification Search
CPC .. C25B 1/55; C25B 1/04; C25B 15/02; C25B 9/00; G06Q 50/06; G06Q 10/063; G06Q 40/04; H01M 8/04201; H01M 8/0656; H01M 2250/10; H01M 8/04298;
(Continued)

(56) References Cited

U.S. PATENT DOCUMENTS

2005/0109394 A1 5/2005 Anderson
2008/0127646 A1* 6/2008 Doland .................... F03D 9/19
60/495
(Continued)

FOREIGN PATENT DOCUMENTS

JP 2002-95167 A 3/2002
JP 2003-47175 A 2/2003
(Continued)

*Primary Examiner* — Christopher E. Everett
(74) *Attorney, Agent, or Firm* — Sughrue Mion, PLLC

(57) ABSTRACT

A control unit is configured to communicate with a terminal owned by a power company. When a hydrogen generation request is received from the terminal, the control unit determines whether hydrogen is to be generated based on a state of a hydrogen generation device, and transmits a determination result to the terminal. When a power sale request is received from the terminal, the control unit determines whether power is to be sold based on a state of the hydrogen generation device, and transmits a determination result to the terminal.

9 Claims, 4 Drawing Sheets

(51) Int. Cl.

| | |
|---|---|
| ***C25B 15/02*** | (2021.01) |
| ***G06Q 50/06*** | (2012.01) |
| ***H01M 8/04082*** | (2016.01) |
| ***H01M 8/0656*** | (2016.01) |
| ***H02J 15/50*** | (2026.01) |

(58) Field of Classification Search
CPC ........... H01M 8/04313; H01M 8/04858; H02J 15/50; Y02E 60/50
See application file for complete search history.

(56) References Cited

U.S. PATENT DOCUMENTS

2008/0195255 A1* 8/2008 Lutze .................... F03D 7/0284 705/400
2008/0236647 A1* 10/2008 Gibson ..................... C25B 1/04 136/244
2011/0040421 A1* 2/2011 Duret ........................ H02J 3/28 307/45
2016/0118801 A1 4/2016 vor dem Esche et al.
2018/0287387 A1* 10/2018 Lansing, Jr. .............. F03D 9/11
2022/0065162 A1* 3/2022 Hunt ....................... C25B 15/02

FOREIGN PATENT DOCUMENTS

| | | | |
|---|---|---|---|
| JP | 2003-257458 | A | 9/2003 |
| JP | 2005-220946 | A | 8/2005 |
| JP | 2016-170594 | A | 9/2016 |
| JP | 2016-530859 | A | 9/2016 |
| JP | 2017-9069 | A | 1/2017 |
| JP | 2020-162299 | A | 10/2020 |
| JP | 2020-202637 | A | 12/2020 |
| WO | 2020/075771 | A1 | 4/2020 |

* cited by examiner

FIG. 1

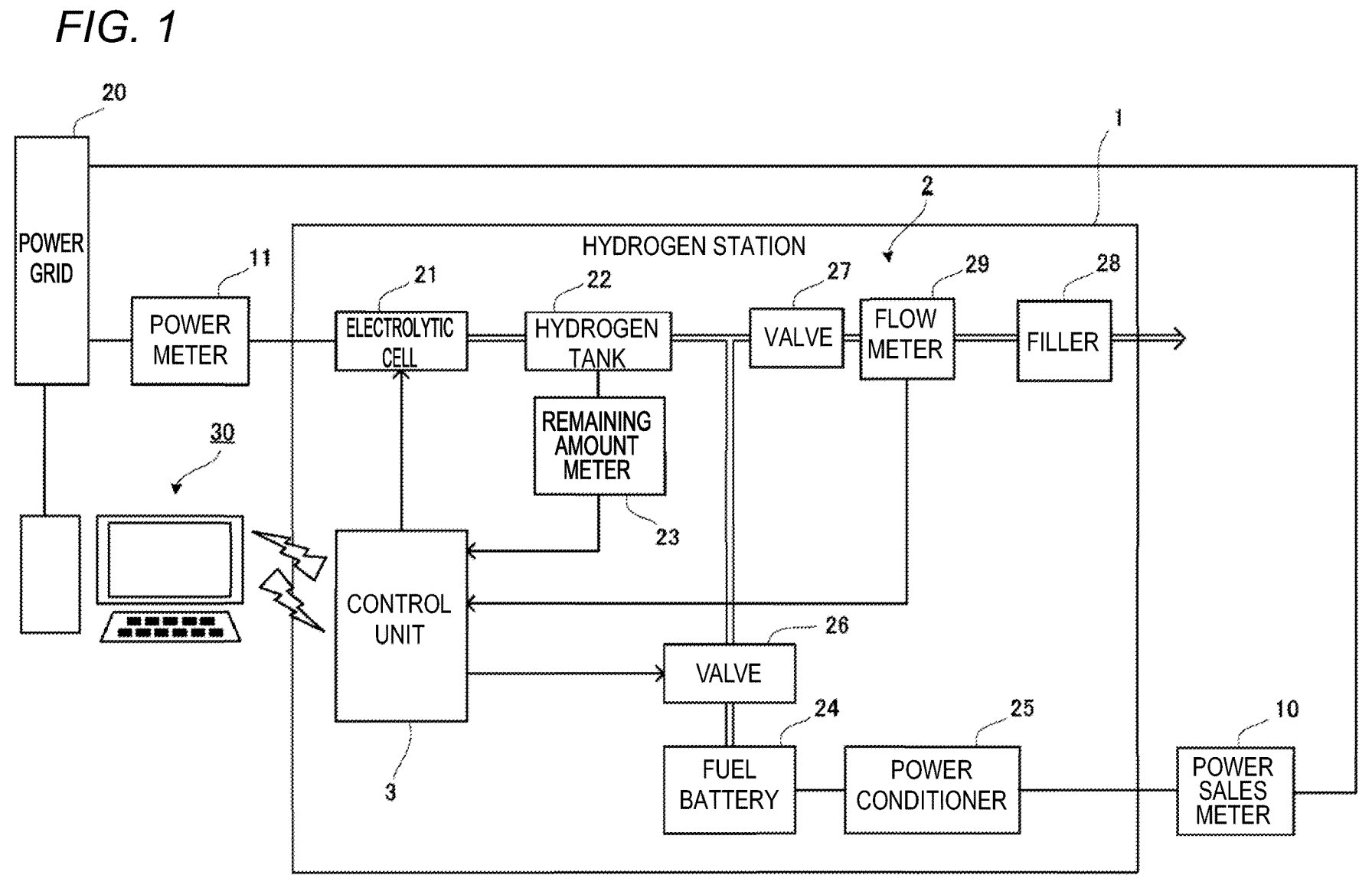

HYDROGEN STATION
POWER GRID
POWER METER
ELECTROLYTIC CELL
HYDROGEN TANK
REMAINING AMOUNT METER
VALVE
FLOW METER
FILLER
CONTROL UNIT
VALVE
FUEL BATTERY
POWER CONDITIONER
POWER SALES METER
1
2
3
10
11
20
21
22
23
24
25
26
27
28
29
30

FIG. 5

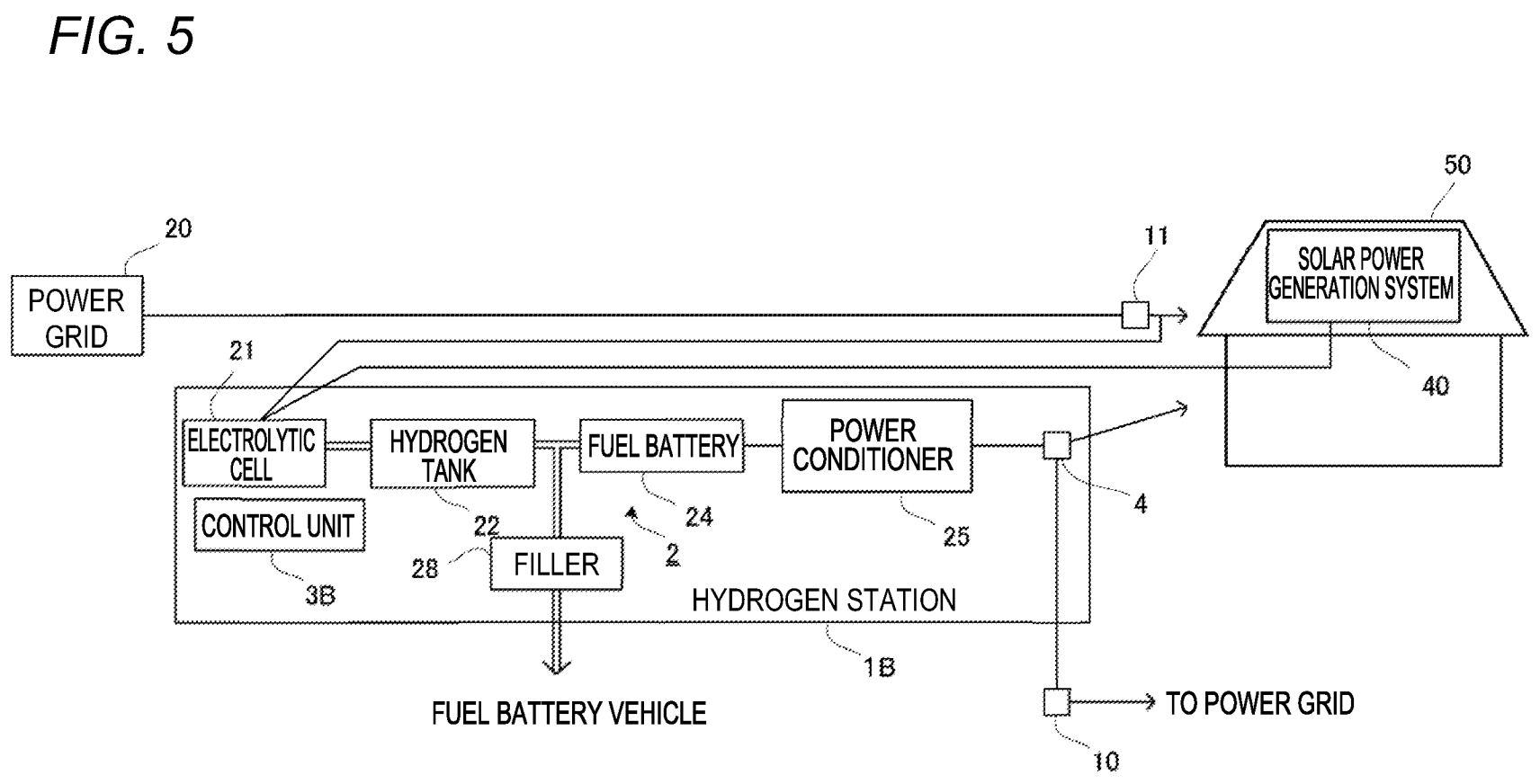

POWER GRID
20
ELECTROLYTIC CELL
21
HYDROGEN TANK
22
FUEL BATTERY
24
POWER CONDITIONER
25
FILLER
28
CONTROL UNIT
3B
2
HYDROGEN STATION
1B
4
10
TO POWER GRID
11
SOLAR POWER GENERATION SYSTEM
40
50
FUEL BATTERY VEHICLE

HYDROGEN STATION, CONTROL UNIT FOR HYDROGEN STATION, AND PROGRAM FOR HYDROGEN STATION

CROSS-REFERENCE TO RELATED APPLICATIONS

The present application is a continuation application of PCT/JP2022/023201 that claims priority to Japanese Patent Application No. 2021-115645 filed on Jul. 13, 2021, the entire content of which is incorporated herein by reference.

TECHNICAL FIELD

The present disclosure relates to a hydrogen station, a control unit for a hydrogen station, and a program for a hydrogen station.

BACKGROUND ART

In recent years, a hydrogen station that supplies hydrogen as fuel to a fuel battery mounted on a fuel battery automobile or the like has been known. In general, it has been considered that hydrogen generated at another place is transported to a hydrogen station, similarly to a gas station, to replenish a hydrogen tank (WO2020/075771, JP2005-220946A, JP2017-009069A, and JP2016-170594A).

It has been considered that a hydrogen station is provided with a private power generator such as a solar power generation system and a hydrogen generation device that generates hydrogen using electricity generated by the private power generator, and a hydrogen tank is replenished with hydrogen generated by the hydrogen generation device (JP2003-257458A).

However, the techniques in WO2020/075771, JP2005-220946A, JP2017-009069A, and JP2016-170594A have a problem in that transportation of hydrogen is expensive. The technique in JP2003-257458A has a problem in that the amount of power generated by the private power generator is not sufficient.

Therefore, in recent years, it has been considered to provide a hydrogen generation device that generates hydrogen using electricity supplied to the hydrogen station by a power grid of a power company, and to replenish a hydrogen tank with hydrogen generated by the hydrogen generation device.

There has been a problem in that simply generating hydrogen using electricity supplied by the power grid at a timing when the hydrogen tank runs low does not contribute to improving the efficiency of power supply by the power company.

The present disclosure provides a hydrogen station, a control unit for a hydrogen station, and a program for a hydrogen station, which can contribute to improving the efficiency of power supply by a power company.

SUMMARY OF INVENTION

In order to achieve the object described above, a hydrogen station, a control unit for a hydrogen station, and a program for a hydrogen station according to the present disclosure are characterized by the following (i) to (iii).

(i)

A hydrogen station including:

a hydrogen generation device including an electrolytic cell configured to electrolyze water to generate hydrogen, a hydrogen tank configured to store the hydrogen generated by the electrolytic cell, a fuel battery configured to generate electricity from the hydrogen in the hydrogen tank, and a converter configured to convert electricity generated by the fuel battery into alternating current and to supply the alternating current to a power grid of a power company; and a control unit configured to control the hydrogen generation device, in which the control unit is configured to communicate with a terminal owned by the power company, the control unit includes a first determination unit configured to determine whether the hydrogen is to be generated based on a state of the hydrogen generation device when a hydrogen generation request is received from the terminal, a first transmission unit configured to transmit a determination result of the first determination unit to the terminal, a second determination unit configured to determine whether power is to be sold based on a state of the hydrogen generation device when a power sale request is received from the terminal, and a second transmission unit configured to transmit a determination result of the second determination unit to the terminal.

(ii) A control unit for a hydrogen station for controlling a hydrogen generation device, the hydrogen generation device including an electrolytic cell configured to electrolyze water to generate hydrogen, a hydrogen tank configured to store the hydrogen generated by the electrolytic cell, a fuel battery configured to generate electricity from the hydrogen in the hydrogen tank, and a converter configured to convert electricity generated by the fuel battery into alternating current and to supply the alternating current to a power grid of a power company, in which the control unit is configured to communicate with a terminal owned by the power company, the control unit including:

a first determination unit configured to determine whether the hydrogen is to be generated based on a state of the hydrogen generation device when a hydrogen generation request is received from the terminal;

a first transmission unit configured to transmit a determination result of the first determination unit to the terminal;

a second determination unit configured to determine whether power is to be sold based on a state of the hydrogen generation device when a power sale request is received from the terminal; and a second transmission unit configured to transmit a determination result of the second determination unit to the terminal.

(iii) A program for a hydrogen station for controlling a hydrogen generation device, the hydrogen generation device including an electrolytic cell configured to electrolyze water to generate hydrogen, a hydrogen tank configured to store the hydrogen generated by the electrolytic cell, a fuel battery configured to generate electricity from the hydrogen in the hydrogen tank, and a converter configured to convert electricity generated by the fuel battery into alternating current and to supply the alternating current to a power grid of a power company, the program causing a computer to function as a first determination unit configured to determine whether the hydrogen is to be generated based on a state of the hydrogen generation device when a hydrogen generation request is received from a terminal owned by the power company, a first transmission unit configured to transmit a determination result of the first determination unit to the terminal, a second determination unit configured to determine whether power is to be sold based on a state of the hydrogen generation device when a power sale request is received from the terminal, and a second transmission unit configured to transmit a determination result of the second determination unit to the terminal.

The present disclosure has been briefly described above. Further, the details of the present disclosure can be clarified by reading modes (hereinafter, referred to as "embodiments") for carrying out the disclosure described below with reference to the accompanying drawings.

BRIEF DESCRIPTION OF DRAWINGS

FIG. 1 is a configuration diagram of a hydrogen station according to a first embodiment of the present disclosure;

FIG. 5 is a configuration diagram of a hydrogen station according to a second embodiment of the present disclosure.

DESCRIPTION OF EMBODIMENTS

Figure 2:
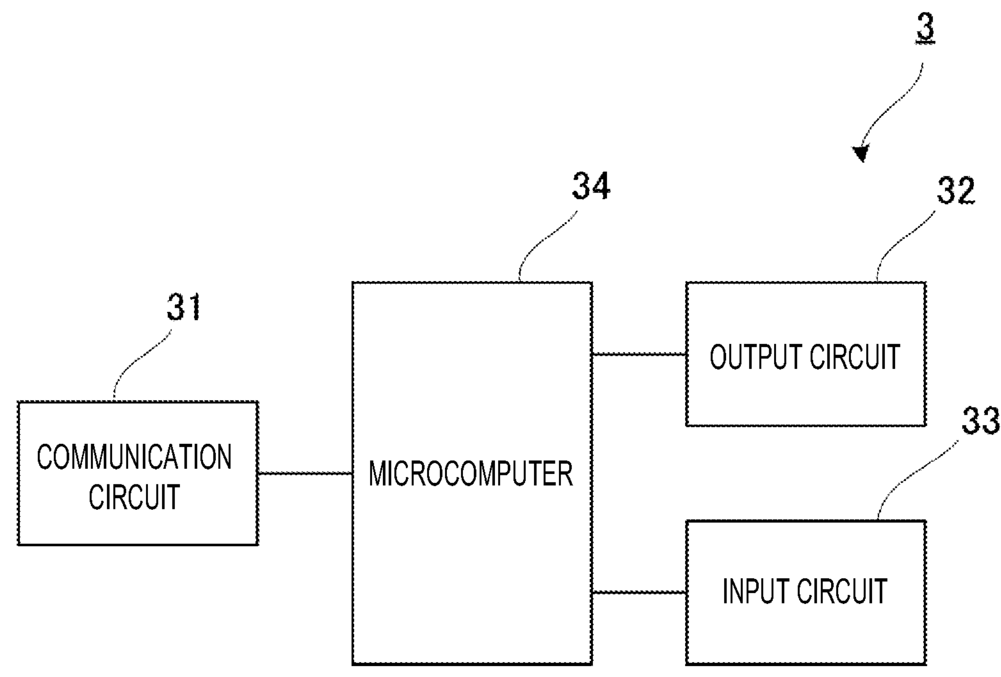
FIG. 2 is a configuration diagram of a control unit constituting the hydrogen station shown in FIG. 1.

Specific embodiments of the present disclosure will be described below with reference to the drawings.

First Embodiment

A hydrogen station according to a first embodiment will be described. A hydrogen station 1 according to the first embodiment is provided in a hydrogen station for filling a hydrogen transport truck or a fuel battery vehicle with hydrogen. As shown in the drawing, the hydrogen station 1 includes a hydrogen generation device 2 that generates hydrogen using electricity supplied from a power grid 20 of a power company, a control unit that controls the hydrogen generation device 2, and a control unit 3 as a control unit for the hydrogen station. The hydrogen generation device 2 includes an electrolytic cell 21, a hydrogen tank 22 that stores hydrogen, a remaining amount meter 23, a fuel battery 24, a power conditioner 25 as a converter, valves 26 and 27, a filler 28, and a flow meter 29.

The electrolytic cell 21 electrolyzes water using electricity supplied from the power grid 20 to generate hydrogen. Electricity from the power grid 20 is supplied to the electrolytic cell 21 via a power meter 11 that measures the amount of used electricity. The hydrogen tank 22 stores hydrogen generated by the electrolytic cell 21. When supplied with hydrogen from the hydrogen tank 22, the fuel battery 24 causes a chemical reaction with oxygen to generate electricity. The remaining amount meter 23 measures the remaining amount of the hydrogen tank 22 and outputs a measured value to the control unit 3 to be described later.

The power conditioner 25 converts direct current electricity generated from the fuel battery 24 into alternating current and supplies the alternating current to the power grid 20 of the power company. Electricity supplied from the power conditioner 25 is supplied to the power grid 20 via a power sales meter 10 that measures the amount of sold power. The valve 26 is provided between the hydrogen tank 22 and the fuel battery 24, and can adjust the amount of hydrogen supplied to the fuel battery 24 by opening and closing. The valve 27 is provided between the hydrogen tank 22 and the filler 28, and can adjust the amount of hydrogen output from the filler 28 by opening and closing. The flow meter 29 is provided between the valve 27 and the filler 28, measures the amount of hydrogen output from the filler 28, and outputs a measured value to the control unit 3 to be described later.

The control unit 3 controls the hydrogen generation device 2 by controlling electricity supplied to the electrolytic cell 21 and the opening and closing of the valve 26. As shown in FIG. 2, the control unit 3 includes a communication circuit 31, an output circuit 32, an input circuit 33, and a microcomputer 34. The communication circuit 31 is a circuit for communicating with a terminal 30 of the power company through Ethernet wireless communication or wired communication. The output circuit 32 is a circuit that is connected to the electrolytic cell 21 and the valve 26 and that outputs a control signal to the electrolytic cell 21 and the valve 26.

The input circuit 33 is a circuit that is connected to the remaining amount meter 23 and the flow meter 29 and that inputs measured values of the remaining amount meter 23 and the flow meter 29. The microcomputer 34 includes a built-in central processing unit (CPU), and controls the entire control unit 3. The CPU is a computer that operates according to a program stored in a memory.

Figure 3:
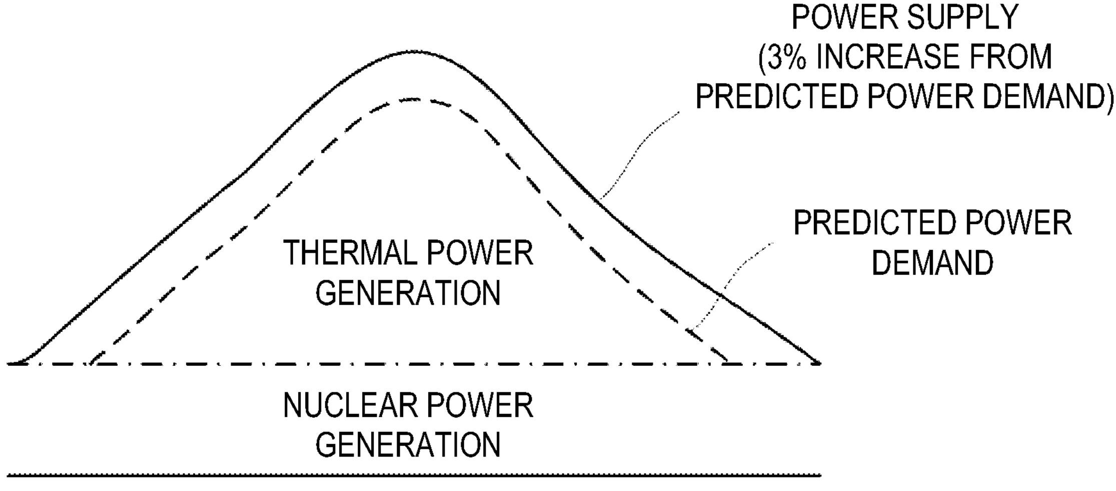
FIG. 3 is a graph showing output control executed by a power company.

Next, before describing the operation of the hydrogen station 1 implemented as described above, output control executed by the power company will be described with reference to FIG. 3. As shown in the drawing, it is difficult to adjust the amount of power generated in nuclear power generation. On the other hand, the amount of power generated in thermal power generation can be adjusted to a certain extent. Therefore, the power company mainly controls the output of thermal power generation in order to match the balance between demand and supply. Specifically, the power company predicts power demand and controls the output of thermal power generation such that the power company can supply power by adding, for example, a 3% margin to the predicted power demand.

Therefore, when the actual power demand is smaller than the predicted power demand, 3% or more of the power becomes surplus power. In the case in which the margin is set to 3% or less in order to reduce this surplus power, when the actual power demand is higher than the predicted power demand, a power outage or the like may occur due to insufficient power.

Therefore, in the present embodiment, when the actual power demand is lower than the predicted power demand, the power company can store the surplus power as hydrogen by transmitting a hydrogen generation request from the terminal 30 to the hydrogen station 1 and causing the hydrogen station 1 to generate hydrogen from the surplus power. When the actual power demand is higher than the predicted power demand, the power company transmits a power sale request from the terminal 30 to the hydrogen station 1 and supplies power from the hydrogen station 1 to the power grid 20.

The hydrogen generation request and the power sale request may be transmitted manually by an employee of the power company operating the terminal 30. Since the power company constantly calculates the power usage rate, the terminal 30 may acquire the power usage rate and automatically transmit the hydrogen generation request and the power sale request according to the acquired power usage rate.

Figure 4:
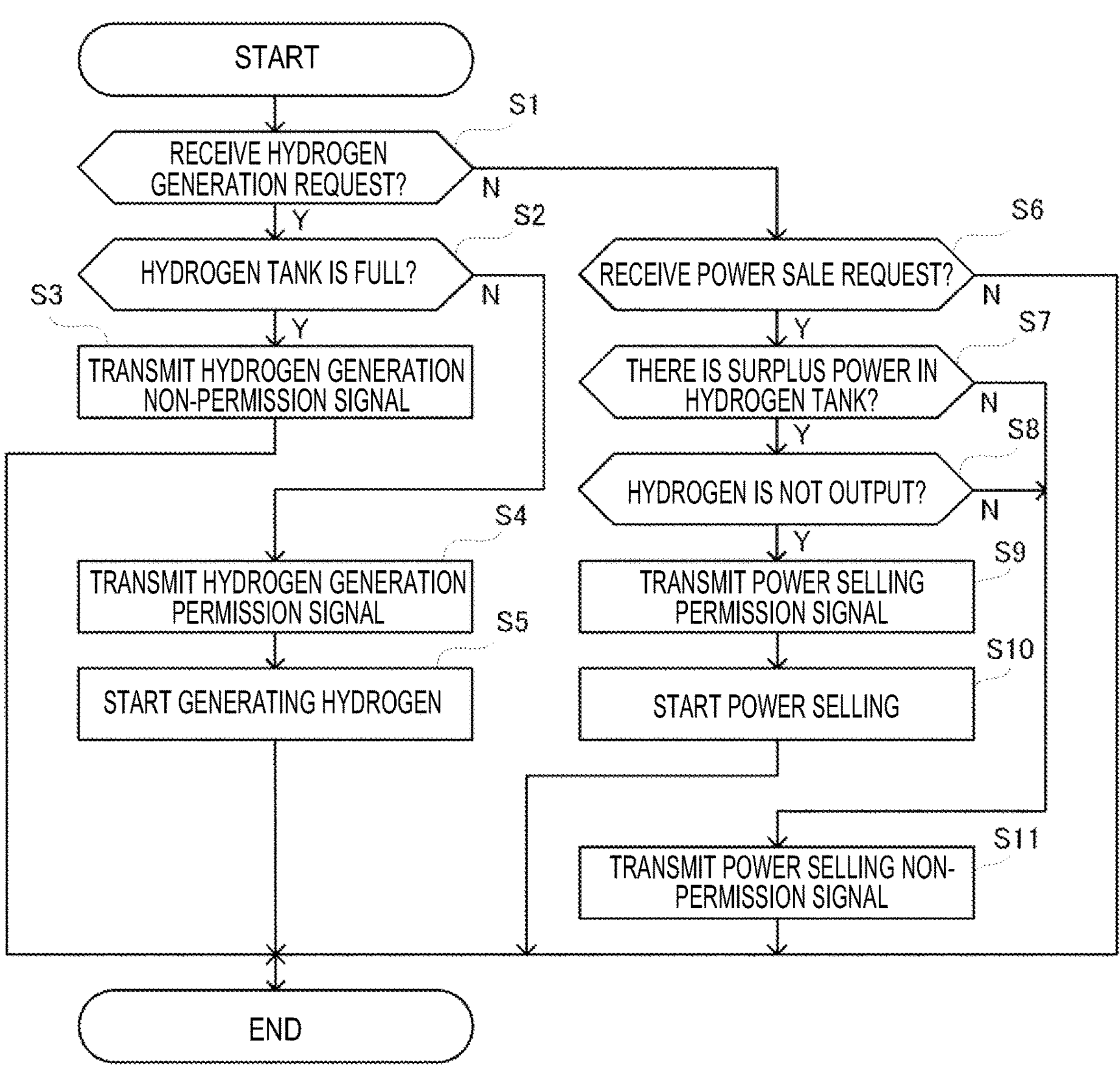
FIG. 4 is a flowchart showing a processing procedure of the control unit shown in FIG. 1.

Next, the operation of the hydrogen station 1 implemented as described above will be described with reference to a flowchart in FIG. 4. When the microcomputer 34 receives the request from the terminal 30, the microcomputer 34 starts the operation in the flowchart shown in FIG. 4. First, when the microcomputer 34 receives the hydrogen generation request (Y in S1), the microcomputer 34 functions as a first determination unit, takes in the measured value of the remaining amount meter 23, and determines whether the hydrogen tank 22 is full (S2). When the hydrogen tank 22 is full (Y in S2), the microcomputer 34 determines that hydrogen cannot be generated, functions as a first transmission unit, transmits a hydrogen generation non-permission signal to the terminal 30 (S3), and then ends the processing.

On the other hand, when the hydrogen tank 22 is not full (N in S2), the microcomputer 34 functions as the first transmission unit, determines that hydrogen can be generated, and transmits a hydrogen generation permission signal to the terminal 30 (S4). Thereafter, the microcomputer 34 functions as a first control unit, starts supplying electricity from the power grid 20 to the electrolytic cell 21, starts generating hydrogen by the electrolytic cell 21 (S5), and ends the processing.

When the microcomputer 34 receives the power sale request (Y in S6), the microcomputer 34 takes in the measured value of the remaining amount meter 23, and determines whether the remaining amount in the hydrogen tank 22 is equal to or higher than a predetermined value and there is surplus power (S7). When it is determined that there is surplus power, the microcomputer 34 determines whether the valve 27 is opened and hydrogen is output from the filler 28 based on a measured value of the flow meter 29 (S8). When hydrogen is not output (Y in S8), the microcomputer 34 functions as a second determination unit and a second transmission unit, determines that power selling is possible, and transmits a power selling permission signal to the terminal 30 (S9).

Thereafter, the microcomputer 34 functions as a second control unit, opens the valve 26 to start power selling (S10), and then ends the processing. When the valve 26 is opened, hydrogen in the hydrogen tank 22 is supplied to the fuel battery 24, and electricity is generated by the fuel battery 24. The electricity generated by the fuel battery 24 is converted into alternating current by the power conditioner 25 and then supplied to the power grid 20.

On the other hand, when there is no surplus power (N in S7), or when hydrogen is output from the filler 28 (N in S8), the microcomputer 34 functions as the second determination unit and the second transmission unit, determines that power selling is not possible, transmits a power selling non-permission signal to the terminal 30 (S11), and then ends the processing.

According to the first embodiment described above, in response to the hydrogen generation request and the power sale request that are transmitted from the terminal 30 of the power company, the control unit 3 can transmit, to the terminal 30 of the power company, the permission signal or the non-permission signal indicating a determination result as to whether hydrogen can be generated and whether power selling is possible. Accordingly, the power company can grasp the hydrogen station 1 that stores surplus power as hydrogen when there is surplus power, and can grasp the hydrogen station 1 that sells power when there is a shortage of power. Therefore, it is possible to supply power with a reduced surplus power margin for the predicted power demand, contributing to improving the efficiency of power supply in the power company.

In the hydrogen station 1, hydrogen may also be stored using cheap electricity when there is surplus power, and the electricity may also be sold at a high price when there is a shortage of power.

According to the first embodiment described above, the microcomputer 34 can generate hydrogen by controlling the hydrogen generation device 2 when the hydrogen generation permission signal is transmitted, and can sell power by controlling the hydrogen generation device 2 when the power selling permission signal is transmitted.

According to the first embodiment described above, the microcomputer 34 determines whether hydrogen can be generated based on the state of the hydrogen tank 22, but the present disclosure is not limited thereto. The microcomputer 34 only needs to be able to determine whether hydrogen can be generated based on the state of the hydrogen generation device 2. For example, the microcomputer 34 may determine whether hydrogen can be generated based on whether there is a failure in the hydrogen generation device 2, particularly the electrolytic cell 21.

According to the first embodiment described above, the microcomputer 34 determines whether power selling is possible based on the state of the hydrogen tank 22 and the usage status of the filler 28, but the present disclosure is not limited thereto. The microcomputer 34 only needs to be able to determine whether power selling is possible based on the state of the hydrogen generation device 2, and may determine whether power selling is possible based on whether there is a failure in the hydrogen generation device 2, particularly the fuel battery 24 or the power conditioner 25.

Second Embodiment

Next, a hydrogen station according to a second embodiment will be described. The hydrogen station 1 according to the first embodiment described above has been described as being provided in a hydrogen station, but the present disclosure is not limited thereto. A hydrogen station 1B may be provided in a home as shown in FIG. 5.

In FIG. 5, portions equivalent to those of the hydrogen station 1 shown in FIG. 1 already described in the first embodiment described above are denoted by the same reference signs, and the detailed description thereof is omitted. As in the first embodiment, the hydrogen station 1B includes the hydrogen generation device 2, a control unit 3B, and a switching unit 4. Since the hydrogen generation device 2 is the same as that in the first embodiment, the detailed description thereof is omitted here. In FIG. 5, in order to simplify the drawing, the remaining amount meter 23, the valves 26 and 27, and the flow meter 29 are omitted.

In the second embodiment, the electrolytic cell 21 is supplied with surplus power from a solar power generation system 40 provided in the home. The switching unit 4 switches the output of the power conditioner 25 between electrical equipment 50 in the home and the power sales meter 10. When the switching unit 4 is switched to an electrical equipment 50 side, the output of the power conditioner 25 can be supplied to the electrical equipment 50. When the switching unit 4 is switched to the power sales meter 10, the output of the power conditioner 25 can be supplied to the power grid 20.

The microcomputer 34 supplies electricity from the power grid 20 to the electrolytic cell 21 when power is cheap, such as at night, and stores the electricity as hydrogen. The microcomputer 34 supplies hydrogen stored in the hydrogen tank 22 to the fuel battery 24 when the electricity demand is high and power is high, such as during the daytime. The microcomputer 34 switches the switching unit 4 to the electrical equipment 50. Accordingly, power generated by the fuel battery 24 can be supplied to the electrical equipment 50 via the power conditioner 25. The microcomputer 34 performs the operation shown in FIG. 4 in the same manner as in the first embodiment, and transmits a power selling permission signal. Thereafter, the microcomputer 34 switches the switching unit 4 to the power sales meter 10, and supplies the power generated by the fuel battery 24 to the power grid 20 via the power conditioner 25.

According to the second embodiment described above, surplus power generated by the solar power generation system 40 can be stored as hydrogen, and another hydrogen tank mounted on a fuel battery vehicle, which is a private vehicle, can be filled with the surplus power.

In the second embodiment described above, the hydrogen station 1B described above is provided in the home, but the present disclosure is not limited thereto. The hydrogen station 1B may be provided at a factory, a company, or the like, and may fill another hydrogen tank mounted on a fuel battery, which is provided in a company car.

In the first and second embodiments described above, a charger may be provided to supply electricity generated by the fuel battery 24 to an electric automobile.

In the first and second embodiments described above, the permission signal and the non-permission signal are transmitted from the hydrogen stations 1 and 1B to the terminal 30, but the present disclosure is not limited thereto. For example, remaining amount information of the hydrogen tank 22 may be periodically transmitted from the hydrogen stations 1 and 1B to the terminal 30. Accordingly, since an electric company can grasp the remaining amount of the hydrogen tank 22 of each of the hydrogen station 1 and 1B, it is possible to preferentially transmit the hydrogen generation request to the hydrogen station 1 and 1B in which the remaining amount of the hydrogen tank 22 is small, or to preferentially transmit the power sale request to the hydrogen station 1 and 1B in which the remaining amount of the hydrogen tank 22 is large.

Here, features of the embodiments of the hydrogen station, the control unit for a hydrogen station, and the program for a hydrogen station according to the present disclosure described above will be briefly summarized and listed in the following (i) to (v).

(i) A hydrogen station (1, 1B) including:

a hydrogen generation device (2) including an electrolytic cell (21) configured to electrolyze water to generate hydrogen, a hydrogen tank (22) configured to store the hydrogen generated by the electrolytic cell (21), a fuel battery (24) configured to generate electricity from the hydrogen in the hydrogen tank (22), and a converter (25) configured to convert electricity generated by the fuel battery (24) into alternating current and to supply the alternating current to a power grid (20) of a power company; and a control unit (3, 3B) configured to control the hydrogen generation device (2), in which the control unit (3, 3B) is configured to communicate with a terminal (30) owned by the power company, the control unit (3, 3B) includes a first determination unit (34) configured to determine whether the hydrogen is to be generated based on a state of the hydrogen generation device (2) when a hydrogen generation request is received from the terminal (30), a first transmission unit (34) configured to transmit a determination result of the first determination unit (34) to the terminal (30), a second determination unit (34) configured to determine whether power is to be sold based on a state of the hydrogen generation device (2) when a power sale request is received from the terminal (30), and a second transmission unit (34) configured to transmit a determination result of the second determination unit to the terminal (30).

According to the configuration in the above (i), in response to the hydrogen generation request and the power sale request that are transmitted from the terminal (30) of the power company, the first and second transmission units (34) can transmit, to the terminal (30) of the power company, the determination result as to whether hydrogen can be generated and whether power selling is possible. Accordingly, the power company can grasp the hydrogen station (1, 1B) that stores surplus power as hydrogen when there is surplus power, and can grasp the hydrogen station (1, 1B) that sells power when there is a shortage of power. Therefore, it is possible to supply power with a reduced surplus power margin for the predicted power demand, contributing to improving the efficiency of power supply in the power company.

(ii)

The hydrogen station (1, 1B) according to claim 1, wherein the control unit (3, 3B) includes a first control unit (34) configured to cause the electrolytic cell (21) to electrolyze the water using electricity from the power grid (20) to generate the hydrogen when the first determination unit (34) determines that the hydrogen is to be generated; and a second control unit (34) configured to cause the hydrogen from the hydrogen tank (22) to be supplied to the fuel battery (24) and to cause the converter (25) to supply electricity generated by the fuel battery (24) to the power grid (20) when the second determination unit determines that the power is to be sold.

According to the configuration in the above (ii), when it is determined that hydrogen can be generated, the first control unit (34) can control the hydrogen generation device (2) to generate hydrogen, and when it is determined that power selling is possible, the second control unit (34) can control the hydrogen generation device (2) to sell power.

(iii)

The hydrogen station (1, 1B) according to (i) or (ii), in which the hydrogen generation device (2) further includes a solar power generation system, and a filler (28) configured to fill another hydrogen tank (22) with the hydrogen stored in the hydrogen tank (22), and in which the electrolytic cell (21) generates the hydrogen using power generated by the solar power generation system.

According to the configuration in the above (iii), surplus power generated by the solar power generation system (40) can be stored as hydrogen, and the other hydrogen tank (22) can be filled with the surplus power.

(iv)

A control unit (3, 3B) for a hydrogen station for controlling a hydrogen generation device (2), the hydrogen generation device (2) including an electrolytic cell (21) configured to electrolyze water to generate hydrogen, a hydrogen tank (22) configured to store the hydrogen generated by the electrolytic cell (21), a fuel battery (24) configured to generate electricity from the hydrogen in the hydrogen tank (22), and a converter (25) configured to convert electricity generated by the fuel battery (24) into alternating current and to supply the alternating current to a power grid (20) of a power company, in which the control unit (3, 3B) is configured to communicate with a terminal (30) owned by the power company, the control unit (3, 3B) including:

a first determination unit (34) configured to determine whether the hydrogen is to be generated based on a state of the hydrogen generation device (2) when a hydrogen generation request is received from the terminal (30);

a first transmission unit (34) configured to transmit a determination result of the first determination unit (34) to the terminal (30);

a second determination unit (34) configured to determine whether power is to be sold based on a state of the hydrogen generation device (2) when a power sale request is received from the terminal (30); and a second transmission unit (34) configured to transmit a determination result of the second determination unit to the terminal (30).

According to the configuration in the above (iv), it is possible to contribute to improving the efficiency of power supply in the power company.

(v)

A program for a hydrogen station for controlling a hydrogen generation device (2), the hydrogen generation device (2) including an electrolytic cell (21) configured to electrolyze water to generate hydrogen, a hydrogen tank (22) configured to store the hydrogen generated by the electrolytic cell (21), a fuel battery (24) configured to generate electricity from the hydrogen in the hydrogen tank (22), and a converter (25) configured to convert electricity generated by the fuel battery (24) into alternating current and to supply the alternating current to a power grid (20) of a power company, the program causing a computer to function as a first determination unit (34) configured to determine whether the hydrogen is to be generated based on a state of the hydrogen generation device (2) when a hydrogen generation request is received from a terminal (30) owned by the power company, a first transmission unit (34) configured to transmit a determination result of the first determination unit (34) to the terminal (30), a second determination unit (34) configured to determine whether power is to be sold based on a state of the hydrogen generation device (2) when a power sale request is received from the terminal (30), and a second transmission unit (34) configured to transmit a determination result of the second determination unit (34) to the terminal (30).

According to the configuration in the above (v), it is possible to contribute to improving the efficiency of power supply in the power company.

Although the present disclosure has been described in detail with reference to the specific embodiments, it is apparent to those skilled in the art that various changes and modifications can be made without departing from the spirit and scope of the present disclosure.

According to the present disclosure, it is possible to provide a hydrogen station, a control unit for a hydrogen station, and a program for a hydrogen station, which can contribute to improving the efficiency of power supply by a power company. The present disclosure having this effect is useful for a hydrogen station, a control unit for a hydrogen station, and a program for a hydrogen station.

What is claimed is:

1. A hydrogen station comprising:

a hydrogen generation device including an electrolytic cell configured to electrolyze water to generate hydrogen, a hydrogen tank configured to store the hydrogen generated by the electrolytic cell, a fuel battery configured to generate electricity from the hydrogen in the hydrogen tank, a converter configured to convert electricity generated by the fuel battery into alternating current and to supply the alternating current to a power grid of a power company, a filler configured to fill an external hydrogen tank with the hydrogen stored in the hydrogen tank, and a flow meter configured to measure an amount of hydrogen being output from the filler; and a control unit comprising a microcomputer and configured to control the hydrogen generation device, wherein the control unit is configured to communicate with a terminal owned by the power company, the control unit being configured to:

receive a value of the amount of hydrogen being output from the flow meter, determine whether the hydrogen is to be generated based on a state of the hydrogen generation device when a hydrogen generation request is received from the terminal, transmit, to the terminal, a determination result of whether the hydrogen is to be generated, and when a power supply request is received from the terminal:

determine whether hydrogen is being output from the filler based on the value received from the flow meter, determine whether power is to be supplied to the power grid based on a determination result of whether the hydrogen is being output from the filler, and transmit, to the terminal, a determination result of whether the power is to be supplied to the power grid.

2. The hydrogen station according to claim 1, wherein the control unit is configured to cause the electrolytic cell to electrolyze the water using electricity from the power grid to generate the hydrogen when the hydrogen is to be generated; and cause the hydrogen from the hydrogen tank to be supplied to the fuel battery and to cause the converter to supply electricity generated by the fuel battery to the power grid when the power is determined to be supplied to the power grid.

3. The hydrogen station according to claim 2, wherein the hydrogen generation device further includes a solar power generation system, and wherein the electrolytic cell generates the hydrogen using power generated by the solar power generation system.

4. The hydrogen station according to claim 1, wherein the hydrogen generation device further includes a solar power generation system, and wherein the electrolytic cell generates the hydrogen using power generated by the solar power generation system.

5. The hydrogen station according to claim 1, wherein the hydrogen generation request and the power supply request are manually input into the terminal by a user of the power company.

6. The hydrogen station according to claim 1, wherein the hydrogen generation device further includes a remaining amount meter configured to measure a remaining amount of hydrogen in the hydrogen tank, and wherein the control unit is configured to:

receive a value of the remaining amount of hydrogen in the hydrogen tank from the remaining amount meter, and when the power supply request is received from the terminal:

determine whether there is a surplus power in the hydrogen tank based on whether the remaining amount is equal to or greater than a predetermined threshold, determine whether the power is to be supplied to the power grid based on a determination result of whether there is the surplus power in the hydrogen tank and the determination result of whether the hydrogen is being output from the filler, and transmit, to the terminal, the determination result of whether the power is to be supplied to the power grid.

7. The hydrogen station according to claim 6, wherein the control unit is configured to:

determine that the power is not to be supplied to the power grid when the remaining amount is less than the predetermined threshold, and determine that the power is not to be supplied to the power grid when the hydrogen is being output from the filler.

8. A control unit for a hydrogen station for controlling a hydrogen generation device, the hydrogen generation device including an electrolytic cell configured to electrolyze water to generate hydrogen, a hydrogen tank configured to store the hydrogen generated by the electrolytic cell, a fuel battery configured to generate electricity from the hydrogen in the hydrogen tank, a converter configured to convert electricity generated by the fuel battery into alternating current and to supply the alternating current to a power grid of a power company, a filler configured to fill an external hydrogen tank with the hydrogen stored in the hydrogen tank, and a flow meter configured to measure an amount of hydrogen being output from the filler, wherein the control unit comprises a microcomputer and is configured to communicate with a terminal owned by the power company, the control unit is configured to:

receive a value of the amount of hydrogen being output from the flow meter, determine whether the hydrogen is to be generated based on a state of the hydrogen generation device when a hydrogen generation request is received from the terminal, and transmit, to the terminal, a determination result of whether the hydrogen is to be generated; and when a power supply request is received from the terminal:

determine whether hydrogen is being output from the filler based on the value received from the flow meter, determine whether power is to be supplied to the power grid based on a determination result of whether the hydrogen is being output from the filler, and transmit, to the terminal, a determination result of whether the power is to be supplied to the power grid.

9. A non-transitory tangible computer readable storage medium that stores a computer program for a hydrogen station for controlling a hydrogen generation device, the hydrogen generation device including an electrolytic cell configured to electrolyze water to generate hydrogen, a hydrogen tank configured to store the hydrogen generated by the electrolytic cell, a fuel battery configured to generate electricity from the hydrogen in the hydrogen tank, a converter configured to convert electricity generated by the fuel battery into alternating current and to supply the alternating current to a power grid of a power company, a filler configured to fill an external hydrogen tank with the hydrogen stored in the hydrogen tank, and a flow meter configured to measure an amount of hydrogen being output from the filler, the computer program, when executed by a processor, causing a computer to perform a process including:

receive a value of the amount of hydrogen being output from the flow meter, determining whether the hydrogen is to be generated based on a state of the hydrogen generation device when a hydrogen generation request is received from a terminal owned by the power company, transmitting, to the terminal, a determination result of whether the hydrogen is to be generated based on the state of the hydrogen generation device, when a power supply request is received from the terminal:

determining whether hydrogen is being output from the filler based on the value received from the flow meter, determining whether power is to be supplied to the power grid based on a determination result of whether the hydrogen is being output from the filler, and transmitting, to the terminal, a determination result of whether the power is to be supplied to the power grid.

* * * * *